June 14, 1938.  H. KOEPPEN ET AL  2,120,896
AUTOMATIC POWER TRANSMISSION FOR AUTOMOTIVE VEHICLES
Filed April 21, 1937

Inventors:
Hans Koeppen,
Hans Grünschneder,
by *Harry E. Dunham*
Their Attorney.

Patented June 14, 1938

2,120,896

UNITED STATES PATENT OFFICE

2,120,896

AUTOMATIC POWER TRANSMISSION FOR AUTOMOTIVE VEHICLES

Hans Koeppen, Berlin-Lichterfelde, and Hans Grünschneder, Berlin-Charlottenburg, Germany, assignors to General Electric Company, a corporation of New York Application April 21, 1937, Serial No. 138,240
In Germany April 24, 1936

3 Claims. (Cl. 192—.01)

Our invention relates to an automatic power transmission and more particularly to a combination hydraulic transmission and mechanical clutch for automotive vehicles.

One object of our invention is to provide a combination hydraulic variable speed power transmission and mechanical clutch in which the operation of the mechanical clutch is responsive to a combination of the vehicle speed and the fuel input to the driving motor.

For further objects and advantages of our invention, reference is had to the following specification when taken in connection with the accompanying drawing, and its scope will be pointed out in the accompanying claims.

Figure 1:
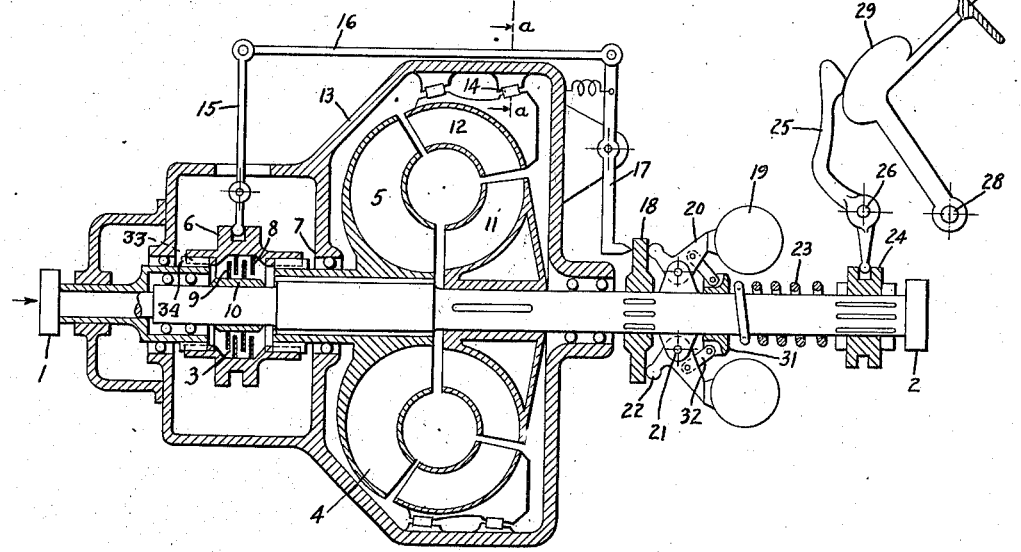
Figure 2:
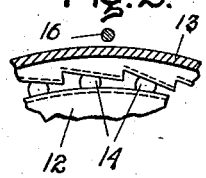

In the accompanying drawing, Fig. 1 illustrates a cross-sectional elevation through the axis of a transmission built in accordance with our invention and Fig. 2 is a fragmentary sectional view taken along line a—a of Fig. 1.

Referring to the drawing in detail, a shaft 1 driven by a motor (not shown) is connected to drive a vehicle drive shaft 2 through a mechanical clutch 3 and a hydraulic transmission 4. The hydraulic transmission is of the type disclosed in Föttinger United States Patents 1,199,359 and 1,199,360. These transmissions comprise a pump element, a turbine element, and a fluid directing element which transmit power between two shafts by circulation of a suitable fluid between them. In the present construction, the pump element 5 is connected to the motor driven shaft 1 through the clutch 3 which comprises a sliding element 6 keyed to the shaft 1 through interengaging keys 33 and 34 and is similarly keyed to the sleeve 7 of the pump element 5. It is provided with clutch plates 8 which engage the clutch plates 9 mounted on a collar 10 on the driven shaft 2 when the sleeve 7 is axially moved to the left. A turbine element 11 is keyed to the shaft 2 and a fluid directing element 12 is mounted in a stationary housing 13, enclosing these elements, by means of a releasable connection 14. This releasable connection, more clearly shown in Fig. 2, is merely a unidirectional clutch comprising rollers mounted in suitable grooves which permit the rotation of the element 12 in one direction, but are wedged between the element and the casing 13 when there is a tendency to move the element 12 in the opposite direction and thereby prevent such movement.

The sliding or movable element 6 of the clutch 3 is operated by a series of interconnected levers 15, 16, and 17, the movement of which is initiated by a collar 18 slidably mounted on the driven shaft 2 and operated by a fly ball governor including fly balls 19 mounted upon levers 20. The levers 20 are pivoted at 21 and are provided with cams 22 which engage the collar 18 and move it forward when the fly balls 19 move outwardly in response to centrifugal force. A regulating spring 23 is adjusted by a sliding collar 24 on the shaft 2. The collar 24 is operated by a lever 25 which in turn is moved about its pivot 26 by a fuel pedal 27 for the motor (not shown). The fuel pedal 27 is mounted on a lever pivoted at 28 and provided with a cam 29 which engages the end of the lever 25.

In operation, the shaft 1 is driven by the motor (not shown) and through collar 6, drives the pump element 5 of the hydraulic transmission. The pump element sets into motion a fluid which is directed at the element 12 and redirected thereby against the turbine element 11 whereby shaft 2 is rotated. When a predetermined speed is reached by the shaft 2, the fly balls 19 move outwardly causing the collar 18 to move toward the left on shaft 2, thereby setting into motion the levers 17, 16, and 15, and bringing clutch plates 8 into engagement with clutch plates 9, thereby making a direct connection between the shafts 1 and 2. When this connection is made, the turbine wheel 11 and the pump wheel 5 rotate in unison with each other and with the normally stationary element 12 which under this condition is released. If the load on the motor is increased, as will be the case when the vehicle moves up an incline, the fuel pedal and lever 27 will be depressed and through lever 25 the collar 24 will be moved to the right along shaft 2 to increase the tension on the spring 23 and thereby exerting a greater pull on the levers 20 through a collar 31, to which the other end of the spring is attached. The collar 31 is connected to the lever 20 by the links 32 which are pivoted respectively at one end on the collar 31 and at the other end on the lever 20. A greater speed of the shaft 2 is thereafter required to keep the clutch 8, 9 closed. If the same speed, or a lower speed, is maintained, the fly balls 19 will move toward the axis of the shaft, and thereby release the clutch 8, 9 and again allow the hydraulic transmission to transmit power between the two shafts. On the other hand, when the vehicle moves slowly on a level road surface, the fuel input to the motor is very small, therefore, the spring tension on the fly ball governor is low, causing it to establish at this relatively low speed, a direct mechanical clutch connection between the motor and the drive shafts at this same low speed.

With this combination of elements, therefore, we have provided a simple transmission responsive to motor load and vehicle speed which will automatically effect a direct mechanical connection between the motor and the vehicle at low speeds when the vehicle is moving along easily on a level surface, and will automatically open this mechanical clutch and connect in the hydraulic transmission at the same vehicle speed when the motor is moving the vehicle up an incline or is, for some other reason, required to exert a greater force to move the vehicle at that speed.

With the arrangement above described it is possible to hold a direct mechanical connection between the motor driven shaft and the vehicle shaft during a greater portion of the operating time of the vehicle. The saving in wear on the motor as a result of this operation is considerable, especially in the above described combination of hydraulic transmission in which the motor speed is 40 to 50% higher when operating through the transmission than it is when direct connected.

What we claim as new and desire to secure by Letters Patent of the United States, is:—

1. In a power transmission for automotive vehicles the combination of input and output shafts, a mechanical clutch operable to directly connect said shafts, a hydraulic power transmission connected between said shafts in multiple with said clutch, a fly ball governor provided with a regulating spring arranged on said output shaft to operate said clutch, a fuel input lever connected to regulate the tension on said spring whereby the said governor effects a closure of said clutch at low speeds and low fuel input and effects an opening of said clutch at an increase of load at that same speed to effect a transmission of power between said shafts through said hydraulic coupling.

2. In a power transmission for an automotive vehicle the combination of a driving shaft and a driven shaft, a variable speed hydraulic transmission device connected to transmit power between said shafts, a clutch operable to establish a direct connection between said shafts, a speed governor responsive to the speed of said driven shaft operable to close said clutch to establish said direct connection, a regulating spring on said governor which regulates the speed at which said clutch is closed and a fuel input lever operable to change the setting of said regulating spring in response to its normal operation whereby the operation of said governor is responsive to both the speed of said vehicle and the fuel input to its prime mover.

3. In a power transmission for automotive vehicles, the combination of an input and an output shaft, a mechanical clutch between said shafts, a hydraulic power transmission connected in multiple with said clutch, a centrifugal governor mounted on said output shaft and operable to close said clutch in response to predetermined speeds of said output shaft, regulating means for changing the speed setting of said governor, a lever operable to regulate the power input to said input shaft, and means responsive to the operation of the power input lever for regulating the said governor regulating means to effect an operation of said clutch in response to both the speed of said output shaft and power input to said input shaft.

HANS KOEPPEN.
HANS GRÜNSCHNEDER.